United States Patent
Nam et al.

(10) Patent No.: US 12,467,798 B2
(45) Date of Patent: Nov. 11, 2025

(54) SYSTEM AND METHOD FOR DIAGNOSING ABNORMAL STATE OF TEMPERATURE OF BATTERY CELL BY USING BMS TEMPERATURE SENSOR

(71) Applicant: LG ENERGY SOLUTION, LTD., Seoul (KR)

(72) Inventors: Ho Chol Nam, Daejeon (KR); Seog Jin Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 652 days.

(21) Appl. No.: 17/795,689

(22) PCT Filed: Jun. 15, 2021

(86) PCT No.: PCT/KR2021/007514
§ 371 (c)(1),
(2) Date: Jul. 27, 2022

(87) PCT Pub. No.: WO2021/261831
PCT Pub. Date: Dec. 30, 2021

(65) Prior Publication Data
US 2023/0056920 A1    Feb. 23, 2023

(30) Foreign Application Priority Data

Jun. 23, 2020 (KR) .................. 10-2020-0076506

(51) Int. Cl.
*G01K 3/08* (2006.01)
*G01K 1/02* (2021.01)
(Continued)

(52) U.S. Cl.
CPC .............. *G01K 3/08* (2013.01); *G01K 1/026* (2013.01); *G01R 31/36* (2013.01);
(Continued)

(58) Field of Classification Search
CPC .......... G01K 3/08; G01K 1/026; G01R 31/36; G01R 31/3648; G01R 31/396;
(Continued)

(56) References Cited

U.S. PATENT DOCUMENTS 5,900,717 A * 5/1999 Lee .................. H02J 7/007194
                                                        320/153
6,624,615 B1 * 9/2003 Park ........................ B60L 53/11
                                                        320/150
(Continued)

FOREIGN PATENT DOCUMENTS

CN    103078150 A    5/2013
CN    110649335 A    1/2020
(Continued)

OTHER PUBLICATIONS

International Search Report (PCT/ISA/210) issued in PCT/KR2021/007514, dated Sep. 17, 2021.
(Continued)

*Primary Examiner* — Laura Martin
*Assistant Examiner* — Philip L Cotey
(74) *Attorney, Agent, or Firm* — Birch, Stewart, Kolasch & Birch, LLP (57) ABSTRACT

The present invention relates to a temperature condition diagnosis system and method for diagnosing a temperature abnormal state of a battery cell or module according to a relative temperature change of the battery cell using a difference in cell or module surface temperature compared to a battery management system (BMS) temperature sensor.

16 Claims, 4 Drawing Sheets

(51) Int. Cl.
*G01R 31/36* (2020.01)
*G01R 31/396* (2019.01)
*H01M 10/42* (2006.01)
*H01M 10/48* (2006.01)

(52) U.S. Cl.
CPC ....... *G01R 31/3648* (2013.01); *G01R 31/396* (2019.01); *H01M 10/425* (2013.01); *H01M 10/4285* (2013.01); *H01M 10/48* (2013.01); *H01M 10/486* (2013.01); *Y02E 60/10* (2013.01)

(58) Field of Classification Search
CPC ........... H01M 10/425; H01M 10/4285; H01M 10/48; H01M 10/486; Y02E 60/10
See application file for complete search history.

(56) References Cited

U.S. PATENT DOCUMENTS

| | | | | |
|---|---|---|---|---|
| 10,333,180 | B2 * | 6/2019 | Seo | B60L 58/15 |
| 11,592,488 | B2 * | 2/2023 | Yamada | G01R 31/3648 |
| 2004/0257089 | A1 * | 12/2004 | Aridome | H01M 10/633 |
| | | | | 324/430 |
| 2009/0130538 | A1 * | 5/2009 | Kaita | G01R 31/374 |
| | | | | 429/61 |
| 2011/0189511 | A1 * | 8/2011 | Yoon | H01M 10/486 |
| | | | | 429/50 |
| 2011/0199053 | A1 * | 8/2011 | Minamiura | H01M 10/482 |
| | | | | 320/136 |
| 2011/0210859 | A1 * | 9/2011 | Kim | H01M 10/443 |
| | | | | 340/657 |
| 2012/0056587 | A1 * | 3/2012 | Iida | H01M 10/443 |
| | | | | 320/134 |
| 2012/0276423 | A1 * | 11/2012 | Asakura | H01M 10/486 |
| | | | | 429/56 |
| 2013/0049971 | A1 * | 2/2013 | Hermann | B60L 3/0046 |
| | | | | 374/45 |
| 2014/0266071 | A1 * | 9/2014 | Tomiyasu | H02J 7/007192 |
| | | | | 320/150 |
| 2016/0261127 | A1 * | 9/2016 | Worry | H02J 7/0029 |
| 2016/0380313 | A1 * | 12/2016 | Morita | H01M 10/425 |
| | | | | 429/50 |
| 2017/0190258 | A1 * | 7/2017 | Hashimoto | B60L 58/15 |
| 2020/0266647 | A1 * | 8/2020 | Ramachandran | H01M 10/48 |
| 2021/0181258 | A1 * | 6/2021 | Li | H01M 10/425 |
| 2021/0288356 | A1 * | 9/2021 | Tsutsui | H01M 10/445 |
| 2023/0010270 | A1 * | 1/2023 | Yamaguchi | H01M 50/581 |
| 2023/0056920 | A1 * | 2/2023 | Nam | G01K 1/026 |
| 2023/0152376 | A1 * | 5/2023 | Imanaka | G01R 31/3275 |
| | | | | 324/415 |

FOREIGN PATENT DOCUMENTS

| | | |
|---|---|---|
| CN | 110940924 A | 3/2020 |
| CN | 111186337 A | 5/2020 |
| JP | 10-126976 A | 5/1998 |
| JP | 2004-88985 A | 3/2004 |
| JP | 2010-271286 A | 12/2010 |
| JP | 5343512 B2 | 11/2013 |
| JP | 2015-77028 A | 4/2015 |
| JP | 2017-10813 A | 1/2017 |
| JP | 6148882 B2 | 6/2017 |
| JP | 6162884 B2 | 7/2017 |
| JP | WO2017/154170 A1 | 9/2017 |
| KR | 10-0624945 B1 | 9/2006 |
| KR | 10-2011-0077774 A | 7/2011 |
| KR | 10-1057556 B1 | 8/2011 |
| KR | 10-1442188 B1 | 9/2014 |
| KR | 10-2018-0058055 A | 5/2018 |
| KR | 10-2054202 B1 | 12/2019 |

OTHER PUBLICATIONS

Extended European Search Report for European Application No. 21828741.5, dated Jul. 17, 2024.

* cited by examiner

| TEMPERATURE ABNORMAL STATE DIAGNOSIS | DIAGNOSIS CONDITION | RELEASE CONDITION |
|---|---|---|
| FIRST ABNORMALITY WARNING STATE (Warn 1) | TEMPERATURE DIFFERENCE≥10℃/1sec | TEMPERATURE DIFFERENCE<10℃/1sec |
| SECOND ABNORMALITY WARNING STATE (Warn 2) | TEMPERATURE DIFFERENCE≥20℃/1sec | TEMPERATURE DIFFERENCE<20℃/1sec |
| FIRST ABNORMAL DANGEROUS STATE (Fault) | TEMPERATURE DIFFERENCE≥20℃/3sec | TEMPERATURE DIFFERENCE<20℃/3sec |
| SECOND ABNORMAL DANGEROUS STATE (Failure) | TEMPERATURE DIFFERENCE≥40℃/25sec | Nothing(PF) |

SYSTEM AND METHOD FOR DIAGNOSING ABNORMAL STATE OF TEMPERATURE OF BATTERY CELL BY USING BMS TEMPERATURE SENSOR

TECHNICAL FIELD

The present invention relates to a system and method for diagnosing a temperature state of a battery cell or module, and more particularly, a system and method for diagnosing a temperature abnormal state of a battery cell or module according to a relative temperature change of the battery cell or module using a BMS temperature sensor.

BACKGROUND ART

A battery used as an energy source for various portable electronic devices, including smart phones, notebook computers, and PDA's, may have a temperature that rises above a reference temperature by circumstances such as when a short circuit occurs inside a cell built into a battery, when an electronic device with a battery consumes an abnormally large amount of power, or when an electronic device with a battery is exposed to a high temperature environment, for example.

As such, when the temperature of the battery rises above the reference temperature, a large amount of gas is released due to the decomposition of an electrolyte or an active material embedded in the battery cell, and the internal pressure of the cell rapidly rises, so that there is a risk of explosion of the cell. In addition, there is a problem in that the lifespan of the battery is reduced by deteriorating the electrochemical characteristics of the battery cell.

In order to solve this problem, when the temperature of the battery cell is measured and increased to more than a predetermined reference value, it is diagnosed as a temperature abnormal state and the current of the battery is cut off to prevent further temperature rise.

However, in the case of the prior art as described above, the temperature abnormal state is simply determined based on the absolute temperature of the battery cell itself, without reflecting any change in the ambient temperature of the battery cell. This has a problem in that the temperature abnormal state of the battery cell cannot be quickly diagnosed because it is impossible to detect the temperature abnormal behavior in advance before the temperature of the battery cell itself rises.

(Patent Document 1) Korean Patent Publication No. 10-2018-0058055
(Patent Document 2) Japanese Patent Publication No. 6162884

DISCLOSURE OF THE INVENTION

Technical Problem

The present invention is intended to solve the above-described problem, by diagnosing an abnormal state with a relative cell temperature state reflecting the change in the ambient temperature of a battery cell, and enabling more rapid diagnosis and action of the temperature abnormal state.

Technical Solution

A system for diagnosing a temperature abnormal state of a battery cell in a battery pack according to the present invention includes: a first temperature measurement unit provided at a periphery of the battery cell to measure a cell periphery temperature at a first predetermined periodic interval; a second temperature measurement unit provided on a surface of the battery cell to measure a cell surface temperature at a second predetermined periodic interval; a temperature difference calculation unit configured to calculate a difference between the cell periphery temperature measured by the first temperature measurement unit and the cell surface temperature measured by the second temperature measurement unit; an abnormal state primary diagnosis unit configured to compare the temperature difference calculated by the temperature difference calculation unit to a predetermined temperature abnormal state condition, and first diagnose a temperature abnormal state of the battery cell according to a comparison result; an abnormal state secondary diagnosis unit configured to finally diagnose a corresponding temperature abnormal state of the battery cell according to whether the corresponding state continues for a predetermined duration time from a time point at which the abnormal state primary diagnosis unit diagnoses the temperature abnormal state; an abnormality action unit configured to take an action corresponding to the final diagnosis result of the abnormal state secondary diagnosis unit; a timer configured to measure a time lasting in the corresponding state from the time point at which the abnormal state primary diagnosis unit diagnoses the temperature abnormal state; and a memory unit configured to store reference data for diagnosing the temperature abnormal state of the battery cell in the abnormal state first and secondary diagnosis units.

Moreover, a system for diagnosing a temperature abnormal state of a battery module includes: a first temperature measurement unit provided at a periphery of the battery module to measure a module periphery temperature at a first predetermined interval; a second temperature measurement unit provided on a surface of the battery module to measure a module surface temperature at a second predetermined periodic interval; a temperature difference calculation unit configured to calculate a difference between the module periphery temperature measured by the first temperature measurement unit and the module surface temperature measured by the second temperature measurement unit; an abnormal state primary diagnosis unit configured to compare the temperature difference calculated by the temperature difference calculation unit to a predetermined temperature abnormal state condition, and first diagnose a temperature abnormal state of the battery module according to a comparison result; an abnormal state secondary diagnosis unit configured to finally diagnose a corresponding temperature abnormal state of the battery module according to whether the corresponding state continues for a predetermined duration time from a time point at which the abnormal state primary diagnosis unit diagnoses the temperature abnormal state; an abnormality action unit configured to take an action corresponding to the final diagnosis result of the abnormal state secondary diagnosis unit; a timer configured to measure a time lasting in the corresponding state from the time point at which the abnormal state primary diagnosis unit diagnoses the temperature abnormal state; and a memory unit configured to store reference data for diagnosing the temperature abnormal state of the battery cell in the abnormal state first and secondary diagnosis units.

Here, the abnormal state primary diagnosis unit includes: a difference comparison unit configured to compare the temperature difference with at least two or more predetermined difference reference values sequentially set from a lowest value; and an abnormality signal output unit configured to output an abnormality signal according to a comparison result of the difference comparison unit.

Moreover, the difference comparison unit compares whether the temperature difference is greater than or less than a predetermined first difference reference value, and from the period thereafter, sequentially compares whether the temperature difference is greater than or equal to a predetermined second difference reference value and third difference reference value as a state in which the temperature difference is greater than or equal to the predetermined first difference reference value is maintained.

Furthermore, the abnormality signal output unit, if the temperature difference is greater than or equal to the predetermined first difference reference value, outputs a first abnormality signal indicating this, if the temperature difference continues to be greater than or equal to the predetermined first difference reference value and becomes greater than or equal to the predetermined second difference reference value, outputs a second abnormality signal indicating this, and if the temperature difference continues to be greater than or equal to the predetermined second difference reference value and becomes greater than or equal to the predetermined third difference reference value, outputs a third abnormality signal indicating this.

Moreover, the abnormal state secondary diagnosis unit, if a time that the temperature difference continues in the corresponding state from the time point at which the first abnormality signal is output from the abnormality signal output unit is more than a predetermined first duration time, finally diagnoses that the temperature state of the current battery cell or module is a first abnormality warning state, and outputs a first abnormality warning signal indicating the first abnormality warning state, in the period thereafter, if the temperature difference is longer than the predetermined first duration time from the time point at which the second abnormality signal is output from the abnormality signal output unit, finally diagnoses that the temperature state of the current battery cell or module is a second abnormality warning state, and outputs a second abnormality warning signal indicating the second abnormality warning, in the period thereafter, if the temperature difference is longer than the predetermined second duration time from the time point at which the second abnormality signal is output from the abnormality signal output unit, finally diagnoses that the temperature state of the current battery cell or module is a first abnormal dangerous state, and outputs a first abnormal dangerous signal indicating the first abnormal dangerous state, and in the period thereafter, if the temperature difference is longer than the predetermined third duration time from the time point at which the third abnormality signal is output from the abnormality signal output unit, finally diagnoses that the temperature state of the current battery cell or module is a second abnormal dangerous state, and outputs a second abnormal dangerous signal indicating the second abnormal dangerous state.

Moreover, the abnormality action unit, if the first abnormality warning signal or the second abnormality warning signal is output from the abnormal state secondary diagnosis unit, blocks current flowing into the battery pack from outside, and in the period thereafter, if the first abnormal dangerous signal or the second abnormal dangerous signal is output from the abnormal state secondary diagnosis unit, additionally disconnects a power line inside the battery pack.

A method for diagnosing a temperature abnormal state of a battery cell of a battery pack according to the present invention includes: a temperature measurement step of measuring a cell periphery temperature and a cell surface temperature of the battery cell at a predetermined periodic interval; a temperature difference calculation step of calculating a difference between the cell periphery temperature and the cell surface temperature measured in the temperature measurement step; a first abnormality warning state diagnosis step of comparing whether the calculated temperature difference is maintained for a predetermined first duration time in a state equal to or greater than a predetermined first difference reference value, and diagnosing whether the temperature state of the battery cell is the first abnormality warning state according to a comparison result; and an abnormality action step of blocking current inflow from the outside to the battery pack when a current temperature state of the battery cell is diagnosed as the first abnormality warning state by the first abnormality warning state diagnosis step, wherein the first abnormality warning state diagnosis step includes: a difference comparison step of comparing whether a current temperature difference calculated in the temperature difference calculation step is equal to or greater than a predetermined first difference reference value; and a duration time confirmation step of confirming whether the temperature difference is maintained for a predetermined first duration time in a corresponding state when the temperature difference is greater than or equal to a predetermined first difference reference value based on the comparison result of the difference comparison step, wherein, when the temperature difference is maintained for the predetermined first duration time in a state equal to or greater than a predetermined first difference reference value, the current temperature state of the battery cell is diagnosed as the first abnormality warning state.

Moreover, a method of diagnosing a temperature abnormal state of a battery module of a battery pack includes: a temperature measurement step of measuring a module periphery temperature and a module surface temperature of the battery module at a predetermined periodic interval; a temperature difference calculation step of calculating a difference between the module periphery temperature and the module surface temperature measured in the temperature measurement step; a first abnormality warning state diagnosis step of comparing whether the calculated temperature difference is maintained for a predetermined first duration time in a state equal to or greater than a predetermined first difference reference value, and diagnosing whether the temperature state of the battery module is the first abnormality warning state according to a comparison result; and an abnormality action step of blocking current inflow from the outside to the battery pack when a current temperature state of the battery module is diagnosed as the first abnormality warning state by the first abnormality warning state diagnosis step, wherein the first abnormality warning state diagnosis step includes: a difference comparison step of comparing whether a current temperature difference calculated in the temperature difference calculation step is equal to or greater than the predetermined first difference reference value; and a duration time confirmation step of confirming whether the temperature difference is maintained for the predetermined first duration time in a corresponding state when the temperature difference is greater than or equal to the predetermined first difference reference value based on the comparison result of the difference comparison step, wherein, when the temperature difference is maintained for a predetermined first duration time in a state equal to or greater than the predetermined first difference reference value, the current temperature state of the battery module is diagnosed as the first abnormality warning state.

Specifically, the method further includes, after diagnosing that the temperature state of the battery module is the first abnormality warning state in the first abnormality warning state diagnosis step, a second abnormality warning state diagnosis step of comparing whether the current temperature difference calculated through the temperature difference calculation step is maintained for a predetermined first duration time in a state equal to or greater than a second difference reference value, which is a value higher than the predetermined first difference reference value, and diagnosing whether the temperature state of the battery module is the second abnormality warning state according to a comparison result; and an abnormality action step of maintaining a current inflow cut-off state from the outside to the battery pack at the time of diagnosing the first abnormality warning state when the current temperature state of the battery module is diagnosed as the second abnormality warning state by the second abnormality warning state diagnosis step, wherein the second abnormality warning state diagnosis step includes: a difference comparison step of comparing whether the current temperature difference calculated in the temperature difference calculation step is equal to or greater than a predetermined second difference reference value; and a duration time confirmation step of confirming whether the temperature difference is maintained for a predetermined first duration time in a corresponding state when the temperature difference is greater than or equal to the predetermined second difference reference value based on the comparison result of the difference comparison step, wherein, when the temperature difference is maintained for a predetermined first duration time in a state equal to or greater than the predetermined second difference reference value, the current temperature state of the battery module is diagnosed as the second abnormality warning state.

The method further includes, after diagnosing that the temperature state of the battery module is the second abnormality warning state in the second abnormality warning state diagnosis step, a first abnormal dangerous state diagnosis step of diagnosing that the current temperature state of the battery module is a first abnormal dangerous state when the temperature difference in the second abnormality warning state diagnosis step is maintained for a second duration time longer than the predetermined first duration time in a state equal to or greater than the predetermined second difference reference value; and an abnormality action step of additionally cutting off power line inside the battery pack when the temperature state of the current battery module is diagnosed as the first abnormal dangerous state by the first abnormal dangerous state diagnosis step.

Then, the method further includes, after diagnosing that the temperature state of the current battery module is the first abnormal dangerous state in the first abnormal dangerous state diagnosis step, a second abnormal dangerous state diagnosis step of comparing whether the current temperature difference calculated through the temperature difference calculation step is maintained for a predetermined third duration time in a state equal to or greater than a predetermined third difference reference value, and diagnosing whether the temperature state of the battery module is a second abnormal dangerous state according to a comparison result, wherein the second abnormal dangerous state diagnosis step includes: a difference comparison step of comparing whether the current temperature difference calculated in the temperature difference calculation step is greater than or equal to a third difference reference value, which is a value higher than a predetermined second difference reference value; and a duration time confirmation step of confirming whether the temperature difference is maintained for a third duration time that is longer than the predetermined second duration time in a corresponding state when the temperature difference is greater than or equal to a predetermined third difference reference value according to a comparison result of the difference comparison step, wherein, when the temperature difference is maintained for a third predetermined duration in a state equal to or greater than the predetermined third difference reference value, it is diagnosed that the current temperature state of the battery module is the second abnormal dangerous state.

Advantageous Effects

According to the present invention, it is possible to detect an abnormal temperature behavior in advance by diagnosing the abnormal state as a relative cell temperature state reflecting the change in the ambient temperature of the battery cell rather than the absolute temperature state of the battery cell itself.

Accordingly, it is possible to more quickly diagnose and take action on a temperature abnormal state of a battery cell. Furthermore, the stability and lifespan of the battery can be improved.

MODE FOR CARRYING OUT THE INVENTION

Hereinafter, embodiments of the present invention will be described in detail with reference to the accompanying drawings so that those of ordinary skill in the art may easily implement the present invention. However, the present invention may be implemented in various forms and is not limited to the embodiments described herein. In the drawings, parts irrelevant to the description are omitted in order to clearly describe the present invention, and like reference numerals refer to like elements throughout the specification.

Hereinafter, the present invention will be described in detail with reference to the drawings.

1. Temperature Abnormal State Diagnosis System According to Present Invention

Figure 1:
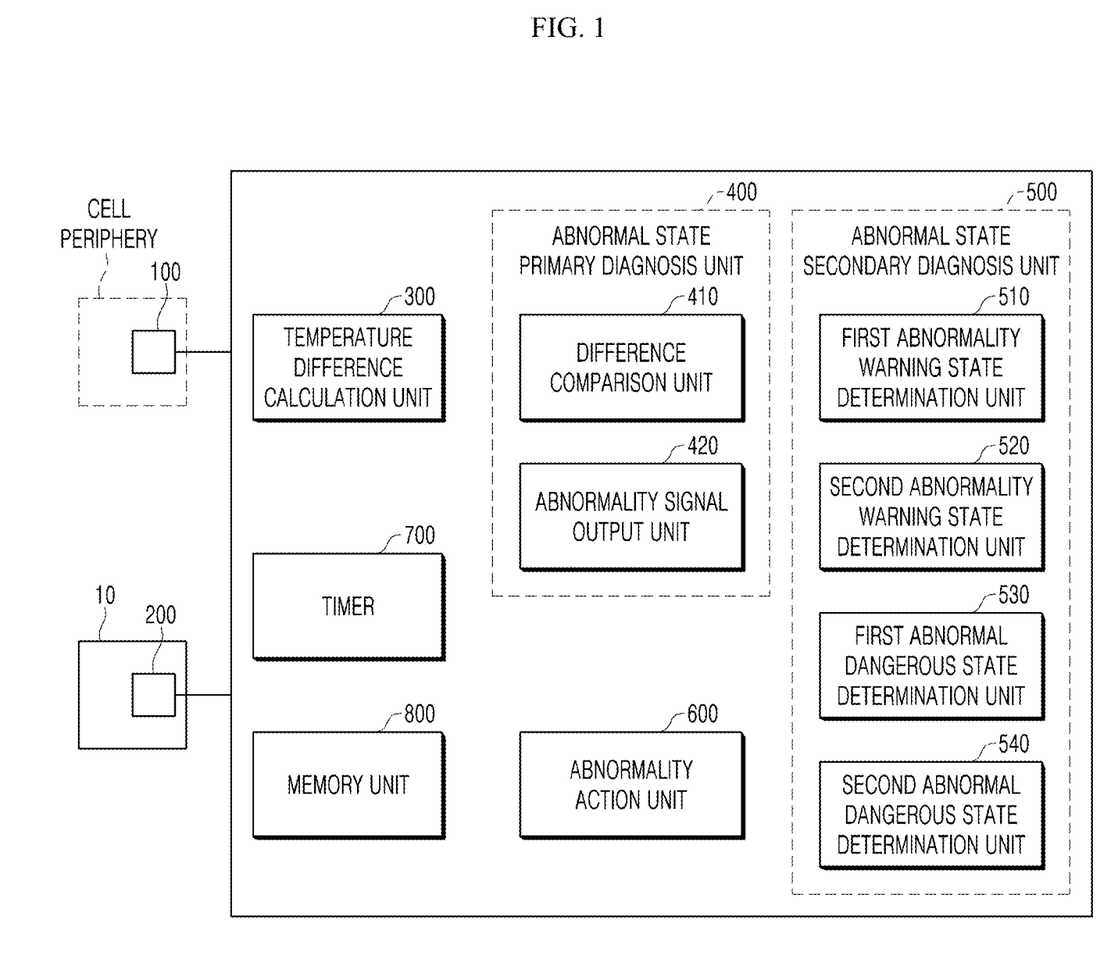
FIG. 1 is a block diagram schematically showing the overall configuration of a temperature abnormal state diagnosis system of a battery cell according to the present invention.

FIG. 1 is a block diagram schematically showing the overall configuration of a temperature abnormal state diagnosis system according to the present invention. The temperature abnormal state diagnosis system includes a first temperature measurement unit 100, a second temperature measurement unit 200, a temperature difference calculation unit 300, an abnormal state primary diagnosis unit 400, an abnormal state secondary diagnosis unit 500, an abnormality action unit 600, a timer 700, and a memory unit 800.

1.1. First Temperature Measurement Unit 100

The first temperature measurement unit is provided at the battery cell periphery and is configured to measure the cell periphery temperature at predetermined periodic intervals.

More specifically, the first temperature measurement unit is mounted on a Battery Management System (BMS) PCB Board to indirectly measure the temperature of the battery cell. For example, it is located close to a heat source such as a cell balancing circuit unit or a precharge circuit unit, and measures the temperature in the region. The temperature sensor of the first temperature measurement unit may be mounted on the PCB Board as described above. As another example, it may be installed in the battery case so as to be close to the heat source.

On the other hand, in the case of a battery module/battery pack composed of a plurality of battery cells, the first temperature measurement unit may be installed adjacent to an electric/chemical heat source including a bus bar for connecting a battery module BMS, a pack BMS or internal battery cell or module, and a circuit unit.

1.2. Second Temperature Measurement Unit 200

The second temperature measurement unit is provided on the surface of the battery cell 10 to measure the cell surface temperature at predetermined periodic intervals.

Unlike the first temperature measurement unit 100 that is provided in the battery cell periphery to measure the temperature of the peripheral part of the cell, the second temperature measurement unit is provided in the battery cell itself to measure the surface temperature thereof.

Meanwhile, in the case of a battery module/battery pack configured with a plurality of battery cells, the second temperature measurement unit may be installed on a surface of the battery module or battery pack to measure the module or pack surface temperature.

1.3. Temperature Difference Calculation Unit 300

The temperature difference calculation unit is a configuration that calculates a difference between the cell periphery temperature measured by the first temperature measurement unit 100 and the cell surface temperature measured by the second temperature measurement unit 200.

1.4. Abnormal State Primary Diagnosis Unit 400

The abnormal state primary diagnosis unit is a configuration that compares the difference between the cell periphery and the cell surface temperature calculated by the temperature difference calculation unit 300 with a predetermined temperature abnormal state condition, and primarily diagnoses a temperature abnormal state of a battery cell according to the comparison result. Such an abnormal state primary diagnosis unit may be configured to include the following detailed configuration.

A. Difference Comparison Unit 410

It is a configuration for comparing the temperature difference calculated by the temperature difference calculation unit 300 with at least two or more predetermined difference reference values.

Here, the predetermined difference reference value may include first to third difference reference values sequentially set from a low value.

First, it is compared whether the calculated temperature difference is greater than or less than a predetermined first difference reference value. Then, when the first abnormality signal is output from the abnormality signal output unit 420 to be described later, thereafter, the temperature difference calculated by the temperature difference calculation unit 300 is compared with a first difference reference value and a second difference reference value set to a value higher than the first difference reference value. Then, when the second abnormal signal is output from the abnormality signal output unit 420 to be described later, thereafter, the temperature difference calculated by the temperature difference calculation unit 300 may be compared with a second difference reference value and a third difference reference value set to a value higher than the second difference reference value.

B. Abnormality Signal Output Unit 420

The abnormality signal output unit may output an abnormality signal according to the comparison result of the difference comparison unit 410.

First, if the temperature difference is equal to or greater than a predetermined first difference reference value, a first abnormality signal indicating this may be output.

On the other hand, after the output of the first abnormality signal, if the temperature difference calculated by easing the increase trend of the temperature difference between the cell periphery and the cell surface is less than a predetermined first difference reference value, a first abnormality release signal indicating this is output.

On the other hand, after the output of the first abnormality signal, if the temperature difference between the cell periphery and the cell surface continues to increase and the calculated temperature difference is greater than or equal to a predetermined second difference reference value, a second abnormality signal indicating this may be output.

After the output of the second abnormality signal, if the increase trend of the temperature difference between the cell periphery and the cell surface is alleviated and the calculated temperature difference is less than a predetermined second difference reference value, a second abnormality release signal indicating this is output.

On the other hand, even after the output of the second abnormality signal, if the temperature difference between the cell periphery and the cell surface continues to increase and the calculated temperature difference is greater than or equal to a predetermined third difference reference value, a third abnormality signal indicating this may be output.

1.5. Abnormal State Secondary Diagnosis Unit 500

The abnormal state secondary diagnosis unit finally diagnoses the corresponding temperature abnormal state of the battery cell according to whether the abnormality signal output from the abnormality signal output unit 420 continues for a predetermined time in the corresponding state from the output time point Here, whether the state corresponding to the output abnormality signal continues for a predetermined time can be confirmed through a time measured by a timer 700 to be described later.

Figure 2:
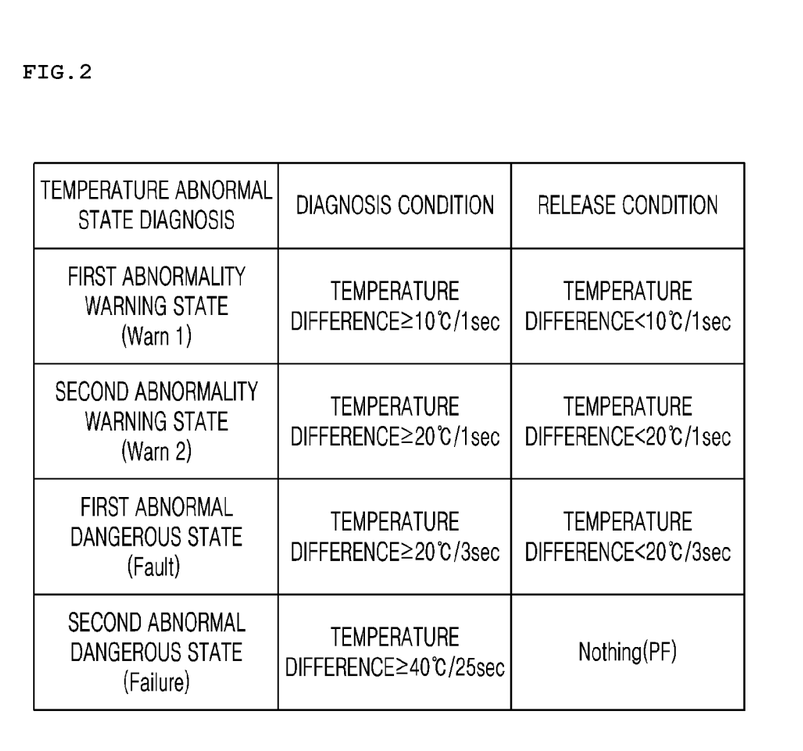
FIG. 2 is a table showing an example of a temperature abnormal state diagnosis condition for each stage.
Figure 3:
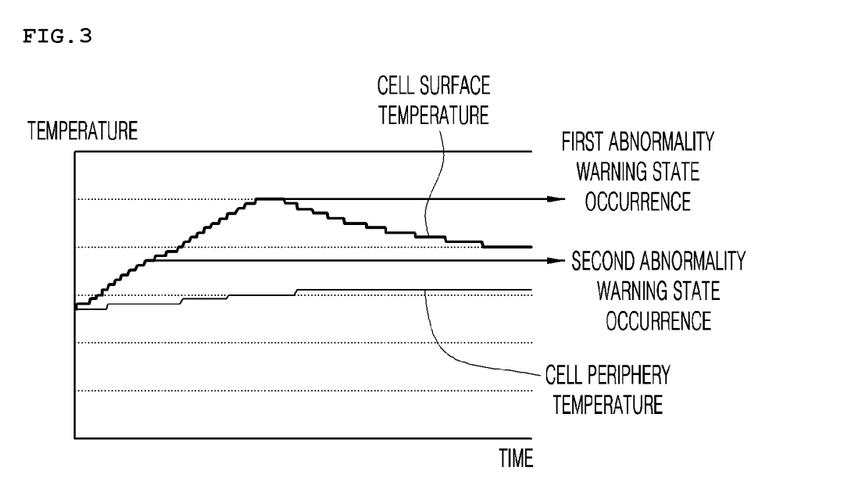
FIG. 3 is a graph showing an example of a temperature change trend between the cell periphery and the cell surface.

FIG. 2 is a table showing an example of a temperature abnormal state condition for diagnosing the temperature abnormal state of the battery cell step by step in the abnormal state secondary diagnosis unit, and FIG. 3 is a graph showing an example of a cell periphery temperature and a cell surface temperature state of a battery cell. With reference to these, the following detailed configuration will be described.

A. First Abnormality Warning State Determination Unit 510

When the first abnormality signal indicating that the temperature difference between the current cell periphery and the cell surface is equal to or greater than a predetermined first difference reference value is output from the abnormality signal output unit 420, the first abnormality warning state determination unit may check whether the time measured in the timer 700 is greater than or equal to a predetermined first duration time, and when the time measured in the timer 700 is greater than or equal to the predetermined first duration time, finally diagnose that the current temperature state of the battery cell is the first abnormality warning state, and output a first abnormality warning signal indicating this. For example, as shown in the table of FIG. 2, when the first difference reference value is 10° C. and the first duration time is set to 1 second, if the temperature difference is maintained at 10° C. or more for 1 second, it is diagnosed as being in the first abnormality warning state. In this case, the timer 700 to be described later measures the duration time from the time point when the first abnormality signal is output.

On the other hand, if the time measured by the timer 700 is less than the predetermined first duration time, even if the cell first abnormality signal is output, the current temperature state of the battery cell is not diagnosed as the first abnormality warning state.

On the other hand, after determining that it is the first abnormality warning state, when the first abnormality release signal indicating that the temperature difference between the cell periphery and the cell surface is less than a predetermined first difference reference value is output from the abnormality signal output unit 420, when the time measured by the timer 700 is greater than or equal to a predetermined first duration time, it may be determined that the first abnormality warning state initially diagnosed by the battery is in a released state by an action of the abnormality action unit 600 to be described later, and a first abnormality warning release signal indicating this may be output. For example, as shown in the table of FIG. 2, if the first difference reference value is 10° C. and the first duration time is set to 1 second, when the temperature difference is maintained for 1 second in a state of less than 10° C., it is diagnosed that the first abnormality warning state that was initially diagnosed is released.

B. Second Abnormality Warning State Determination Unit 520

As shown in FIG. 3, even after the first abnormality warning state determination unit 510 finally diagnoses that the current temperature state of the battery cell is the first abnormality warning state, when the trend of increasing temperature difference between the cell periphery and the cell surface continues and a second abnormality signal indicating that the temperature difference between the current cell periphery and the cell surface is equal to or greater than a predetermined second difference reference value is output from the abnormality signal output unit 420, if the duration time from the time point at which the second abnormality signal measured by the timer 700 is output in the same manner as described above becomes a predetermined first duration time, the second abnormality warning state determination unit may finally diagnose that the current temperature state of the battery cell is the second abnormality warning state, and output a second abnormality warning signal indicating this. For example, as shown in the table of FIG. 2, when the second difference reference value is set to 20° C. and the first duration time is set to 1 second, if the temperature difference is maintained at 20° C. or higher for 1 second, it is diagnosed as the second abnormality warning state.

On the other hand, if the time measured by the timer 700 is less than the predetermined first duration time, even if the cell second abnormality signal is output, the current temperature state of the battery cell is not diagnosed as the second abnormality warning state.

On the other hand, after determining that it is the second abnormality warning state, when the second abnormality release signal indicating that the temperature difference between the cell periphery and the cell surface is less than a predetermined second difference reference value is output from the abnormality signal output unit 420, if the time measured by the timer 700 is greater than or equal to a predetermined first duration time, it may be determined that the second abnormality warning state initially diagnosed by the battery is in a released state by an action of the abnormality action unit 600 to be described later, and a second abnormality warning release signal indicating this may be output. For example, as shown in the table of FIG. 2, if the second difference reference value is 20° C. and the first duration time is set to 1 second, when the temperature difference is maintained for 1 second in a state of less than 20° C., it is diagnosed that the second abnormality warning state that was initially diagnosed is released.

C. First Abnormal Dangerous State Determination Unit 530

Even after the second abnormality warning state determination unit 520 finally diagnoses that the current temperature state of the battery cell is the second abnormality warning state, when the temperature difference between the cell periphery and the cell surface continues as the second abnormality warning state and the duration time from the time point at which the second abnormality signal measured by the timer 700 is output is greater than or equal to a predetermined second duration time set to a time longer than the predetermined first duration time, the first abnormal dangerous state determination unit finally diagnoses that the current temperature state of the battery cell is a first abnormal dangerous state indicating a higher risk than the second abnormality warning state, and outputs a first abnormal dangerous signal indicating this.

For example, as shown in the table of FIG. 2, when the second difference reference value is 20° C. and the second duration time is set to 3 seconds, if the temperature difference is maintained for 3 seconds more than 1 second in a state of 20° C., it is diagnosed as a first abnormal dangerous state.

Here, if the time measured by the timer 700 is less than a predetermined second duration time, it is not finally diagnosed as a first abnormal dangerous state, and it maintains the second abnormality warning state diagnosed by the second abnormality warning state determination unit 520.

On the other hand, after determining that it is the second abnormality warning state, when the duration time from the time point at which the second abnormality release signal indicating that the temperature difference between the cell periphery and the cell surface is less than a predetermined second difference reference value is output from the abnormality signal output unit 420 is greater than or equal to a predetermined second duration time, it may be determined that the first abnormality warning state initially diagnosed by the battery is in a released state by an action of the abnormality action unit 600 to be described later, and a first abnormal dangerous release signal indicating this may be output. For example, when the second difference reference value is set to 20° C. and the second duration time is set to 3 seconds as shown in the table of FIG. 2, if the temperature difference after diagnosis of the first abnormal dangerous state is maintained for 3 seconds in a state of less than 20° C., it is diagnosed that the first abnormal dangerous state, which was initially diagnosed, has been released.

D. Second Abnormal Dangerous State Determination Unit 540

Even after the first abnormal dangerous state determination unit 530 finally diagnoses that the current temperature state of the battery cell is the first abnormal dangerous state, when the trend of increasing temperature difference between the cell periphery and the cell surface continues and a third abnormality signal indicating that the temperature difference between the current cell periphery and the cell surface is equal to or greater than a predetermined third difference reference value is output from the abnormality signal output unit 420, the second abnormal dangerous state determination unit may check whether the duration time from the time point at which the third abnormality signal measured by the timer 700 is output is equal to or greater than the third duration time in the same manner as described above and when the duration time is equal to or greater than the third duration time, finally diagnose that the current temperature state of the battery cell is the second abnormal dangerous state, and output a second abnormal dangerous signal indicating this. For example, as shown in the table of FIG. 2, when the third difference reference value is set to 40° C. and the third duration time is set to 25 seconds, if the current temperature difference is maintained at 40° C. or higher for 25 seconds, it is diagnosed as the second abnormal dangerous state with the highest risk.

Here, as described above, the first abnormality warning state, the second abnormality warning state, the first abnormal dangerous state, and the second abnormal dangerous state sequentially indicate the degree of risk for the current temperature state of the battery cell.

Accordingly, when the second abnormal dangerous state determination unit diagnoses that the current temperature state of the battery cell is the second abnormal dangerous state, since a separate improvement action is required in addition to the abnormality action of the abnormality action unit 600, unlike the first and second abnormality warning state determination units 510 and 520 and the first abnormal dangerous state determination unit 530 described above, whether or not the initially diagnosed second abnormal state is released is not determined.

1.6. Abnormality Action Unit 600

The abnormality action unit is a configuration that takes an action corresponding to the diagnosis signal output from the abnormal state secondary diagnosis unit 500 to block the increasing trend of temperature difference between the battery cell periphery and the cell surface, that is, to prevent the temperature condition of the battery cell from deteriorating.

When the first abnormality warning signal or the second abnormality warning signal is output from the abnormal state secondary diagnosis unit 500, by blocking the external relay of the battery pack, measures can be taken to prevent further current from flowing into the battery pack from the outside.

On the other hand, after taking measures to block the external relay of the battery pack as described above, when the first abnormality warning release signal or the second abnormality warning release signal is output from the abnormal state secondary diagnosis unit 500, it is possible to release the block of the battery pack external relay.

On the other hand, when the first abnormal dangerous signal or the second abnormal dangerous signal is output from the abnormal state secondary diagnosis unit 500, it is possible to take measures to cut off the power line inside the pack by blocking the relay inside the battery pack. As described above, since the output of the first and second abnormal dangerous signals indicates that the risk of the temperature state of the battery cell is worse than that of the first and second abnormality warning signals, this is to reduce the temperature of the battery cells by minimizing the heat generated by the current flow by preventing the current from flowing inside the pack.

Then, when the first abnormal dangerous release signal is output from the abnormal state secondary diagnosis unit 500, by unblocking the relay inside the battery pack, the current flow inside the pack can be opened.

Additionally, the abnormality action unit may report each abnormal state diagnosis result of the abnormal state secondary diagnosis unit 500 to an external upper system.

1.7. Timer 700

When an abnormality signal or an abnormality release signal is output from the abnormality signal output unit 420, a timer measures the duration from its output time point.

For example, when the first abnormality signal is output from the abnormality signal output unit 420, the time maintained in the corresponding state is measured from the output time point. As described above, the duration time measured by the timer is used as a criterion for final diagnosis of a temperature abnormal state corresponding to an abnormality signal in the abnormal state secondary diagnosis unit 500.

1.8. Memory Unit 800

The memory unit stores reference data for diagnosing a temperature abnormal state of a battery cell in the abnormal state primary diagnosis unit 400 and the abnormal state secondary diagnosis unit 500.

Here, the reference data may include first to predetermined third difference reference values and predetermined first to third duration time values.

Meanwhile, in the above, only the diagnosis of the temperature abnormal state of the battery cell has been specifically described, but the present invention is not limited thereto, and even in the case of a battery module/battery pack composed of a plurality of battery cells, it is possible to configure to diagnose the temperature abnormal state of the battery module/battery pack by applying the same method as described above.

2. Method for Diagnosing Temperature Abnormal State According to Present Invention A method of diagnosing a temperature abnormal state of a battery cell according to the present invention will be described with reference to FIG. 4.

2.1. Temperature Measurement Step S100

Figure 4:
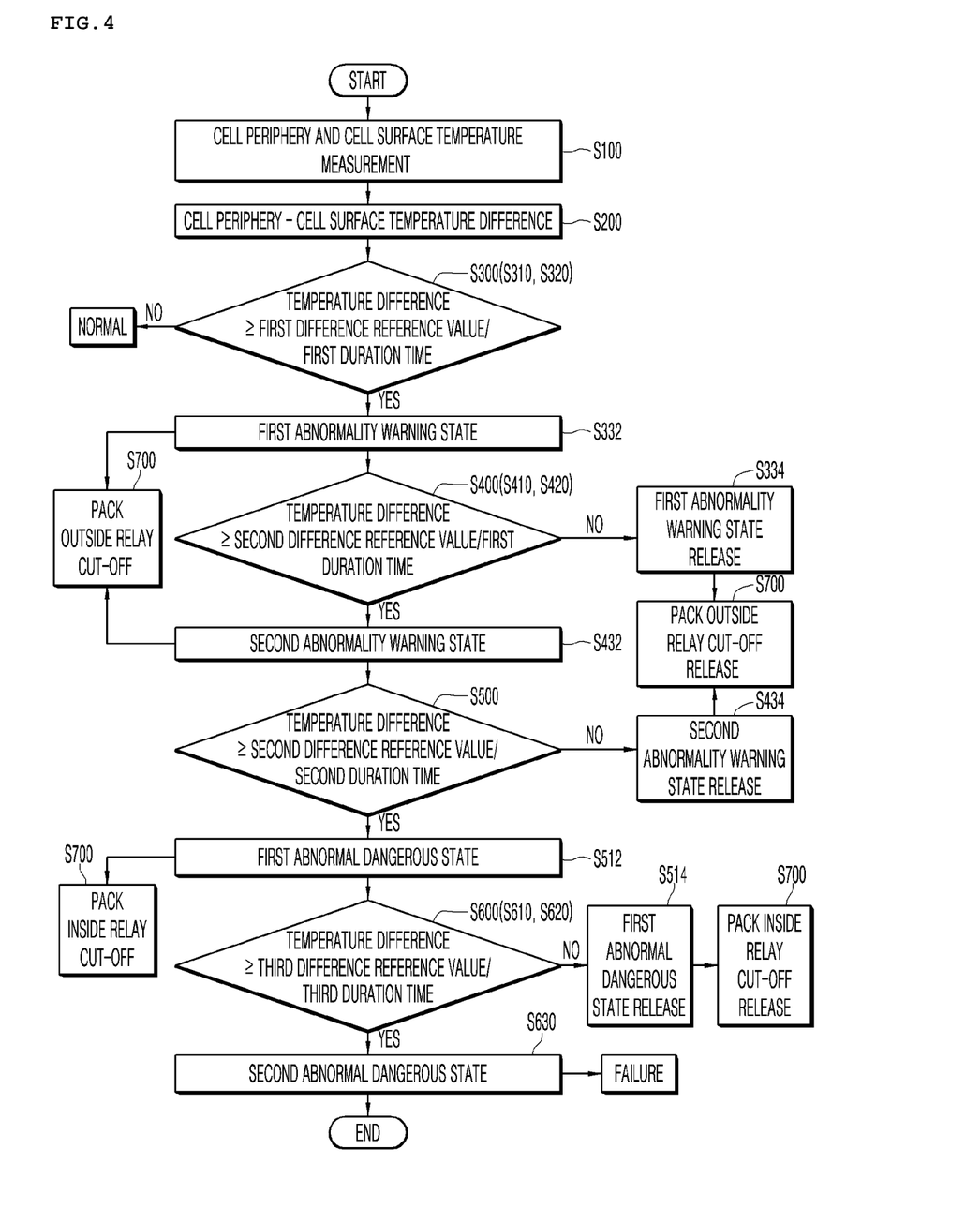
FIG. 4 is a flowchart illustrating a method for diagnosing a temperature abnormal state of a battery cell according to the present invention.

The temperature measurement step is a step of measuring the cell periphery temperature and the cell surface temperature of the battery cell at predetermined periodic intervals. Unlike the prior art of diagnosing a temperature abnormal state using only the cell surface temperature of the battery cell, in the present invention, the temperature abnormal state of the battery cell is diagnosed by reflecting changes in the cell surface temperature and the cell periphery temperature.

This step is performed by for example, the first temperature measurement unit 100 for measuring the cell periphery temperature provided at a position close to a heat source such as a cell balancing circuit unit or a precharge circuit unit and the second temperature measurement unit 200 provided on the cell surface of the battery cell to measure the temperature of the cell itself.

2.2. Temperature Difference Calculation Step S200

The temperature difference calculation step is a step of calculating the difference between the cell periphery temperature and the cell surface temperature measured in the temperature measurement step S100, and is performed by the above-described temperature difference calculation unit 300.

2.3. First Abnormality Warning State Diagnosis Step S300

The first abnormality warning state diagnosis step diagnoses whether the temperature state of the battery cell is a first abnormality warning state according to whether it is maintained for a predetermined first duration time in a state where the temperature difference between the cell periphery and the cell surface calculated in the temperature difference calculation step S200 is equal to or greater than a predetermined first difference reference value.

A. Difference Comparison Step S310

First, the temperature difference calculated in the temperature difference calculation step S200 is compared with a predetermined first difference reference value, and this is performed by the difference comparison unit 410 of the abnormal state primary diagnosis unit 400 described above.

B. Duration Time Confirmation Step S320

As a result of the comparison of the difference comparison step S310, if the temperature difference is greater than or equal to a predetermined first difference reference value, it is checked whether the state is maintained for a predetermined first duration time. When the temperature difference is maintained for a predetermined first duration time in a state equal to or greater than the first difference reference value, it may be diagnosed that the current temperature state of the battery cell is the first abnormality warning state corresponding to the lowest risk level 1 among all 4 stages of diagnosing the temperature abnormal state. For example, if the first difference reference value is 10° C. and the first duration time is set to 1 second as shown in the table of FIG. 2, when the temperature difference is maintained for 1 second in a state of 10° C. or higher, it is diagnosed as a first abnormality warning state (S332).

Then, in the abnormality action step S700 to be described later, as the current temperature state of the battery cell is the first abnormality warning state, in order to mitigate the increase in temperature difference between the cell periphery and the cell surface of the battery cell, it is possible to block the current flowing into the battery pack from the outside by taking measures such as blocking the external relay of the battery pack.

Meanwhile, as described above, if it is maintained for a predetermined first duration time in a state where the temperature difference between the cell periphery and the cell surface calculated after diagnosing that the current temperature state of the battery cell is the first abnormality warning state is less than the first difference reference value, the diagnosed first abnormality warning state may be diagnosed as being released. For example, as shown in the table of FIG. 2, if the first difference reference value is 10° C. and the first duration time is set to 1 second, when the temperature difference is maintained for 1 second in a state of less than 10° C., it is diagnosed that the first abnormality warning state that was initially diagnosed is released (S334).

Then, the abnormality action step S700 may release the blocking of the external relay of the battery pack that takes an action according to the diagnosis of the first abnormality warning state.

This step is made by the first abnormality warning state determination unit 510 of the abnormal state secondary diagnosis unit 500 and the timer 700.

2.4. Second Abnormality Warning State Diagnosis Step S400

The second abnormality warning state diagnosis step is a step of diagnosing whether the temperature difference between the cell periphery and the cell surface increases and enters the second abnormality warning state as shown in FIG. 3 even after diagnosing that the temperature state of the battery cell is the first abnormality warning state in the first abnormality warning state diagnosis step S300.

A. Difference Comparison Step S410

The difference comparison step compares whether the current temperature difference calculated after the first abnormality warning state diagnosis step S400 is greater than or equal to a predetermined second difference reference value, which is a value higher than a predetermined first difference reference value (the difference comparison unit 410).

B. Duration Time Confirmation Step S420

As a result of comparison in the difference comparison step S410, if the current temperature difference is equal to or greater than a predetermined second difference reference value, it is checked whether the state is maintained for a predetermined first duration time. If the current temperature difference is maintained for a predetermined first duration time in a state equal to or greater than a predetermined second difference reference value, it may be diagnosed that the current temperature state of the battery cell is a second abnormality warning state having a higher risk than the first abnormality warning state. For example, as shown in the table of FIG. 2, when the second difference reference value is set to 20° C. and the first duration time is set to 1 second, if the temperature difference is maintained at 20° C. or higher for 1 second, it is diagnosed as the second abnormality warning state (S432).

Then, in the abnormality action step S700 to be described later, it maintains the battery pack external relay cut-off state, which was taken according to the first abnormality warning state diagnosis in the first abnormality warning state diagnosis step S300, and still blocks the current inflow from the outside to the battery pack.

Meanwhile, as described above, if it is maintained for a predetermined first duration time in a state where the temperature difference between the cell periphery and the cell surface calculated after diagnosing that the current temperature state of the battery cell is the second abnormality warning state is less than the second difference reference value, the diagnosed second abnormality warning state may be diagnosed as being released. For example, as shown in the table of FIG. 2, if the second difference reference value is 20° C. and the first duration is set to 1 second, when the temperature difference is maintained for 1 second in a state of less than 20° C., it is diagnosed that the second abnormality warning state that was initially diagnosed is released (S434).

Then, the abnormality action step S700 may release the blocking of the external relay of the battery pack maintained according to the diagnosis of the second abnormality warning state.

2.5. First Abnormal Dangerous State Diagnosis Step S500

The first abnormal dangerous state diagnosis step diagnoses that the current temperature state of the battery cell is a first abnormal dangerous state with a higher risk than the second abnormality warning state if the predetermined second duration time set to a time longer than the predetermined first duration time is maintained in a state where the temperature difference in the duration time confirmation step (S420) of the second abnormality warning state diagnosis step (S400) is equal to or greater than a predetermined second difference reference value For example, as shown in the table of FIG. 2, when the second difference reference value is 20° C. and the second duration time is set to 3 seconds, if the temperature difference is maintained for 3 seconds more than 1 second in a state of 20° C., it is diagnosed as a first abnormal dangerous state (S512).

Then, in the abnormality action step S700 to be described later, the battery pack relay cut-off state maintained according to the second abnormality warning state diagnosis of the second abnormality warning state diagnosis step S400 may be still maintained, and the current flow inside the pack may also be blocked by cutting off the internal relay of the battery pack.

On the other hand, if the temperature difference between the cell periphery and the cell surface calculated after the current battery cell temperature state is diagnosed as the first abnormal dangerous state as described above is maintained for a predetermined second duration time in a state that is less than the second difference reference value, the diagnosed first abnormal dangerous state may be diagnosed as being released. For example, when the second difference reference value is set to 20° C. and the second duration time is set to 3 seconds as shown in the table of FIG. 2, if the temperature difference after diagnosis of the first abnormal dangerous state is maintained for 3 seconds in a state of less than 20° C., it is diagnosed that the first abnormal dangerous state, which was initially diagnosed, has been released (S514).

Then, in the abnormality action step S700, the external relay cut-off state of the battery pack is maintained, but a measure may be taken to open the internal relay of the battery pack that has been blocked according to the first abnormal dangerous state diagnosis.

2.6. Second Abnormal Dangerous State Diagnosis Step S600

The second abnormal dangerous state diagnosis step is a step of diagnosing whether the it has entered the second abnormal dangerous state as the temperature difference between the cell periphery and the cell surface increases, even after diagnosing that the temperature state of the battery cell is the first abnormal dangerous state in the first abnormal dangerous state diagnosis step S500.

A. Difference Comparison Step S610

The difference comparison step compares whether the current temperature difference calculated after the first abnormal dangerous state diagnosis step S500 is greater than or equal to a predetermined third difference reference value, which is a value higher than a predetermined second difference reference value (the difference comparison unit 410)

B. Duration Time Confirmation Step S620

As a result of the comparison of the difference comparison step S610, if the current temperature difference is equal to or greater than the predetermined third difference reference value, it is checked whether the current temperature difference is maintained for a predetermined third duration time that is longer than the predetermined second duration time. When the current temperature difference is maintained for a predetermined third duration time in a state equal to or greater than a predetermined third difference reference value, it may be diagnosed that the current temperature state of the battery cell is a second abnormal dangerous state that is higher in risk than the first abnormal dangerous state, that is, the highest dangerous state. For example, as shown in the table of FIG. 2, when the third difference reference value is set to 40° C. and the third duration time is set to 25 seconds, if the current temperature difference is maintained at 40° C. or higher for 25 seconds, it is diagnosed as the second abnormal dangerous state with the highest risk (S630).

Then, in the abnormality action step S700 to be described later, by maintaining the relay cut-off state inside the battery pack, which was taken according to the first abnormal dangerous state diagnosis in the first abnormal dangerous state diagnosis step S00, as a result, all current into/out of the battery pack remains blocked.

On the other hand, in the above-described first abnormality warning state diagnosis step S300, second abnormality warning state diagnosis step S400 and first abnormal dangerous state diagnosis step S500, as the width of the temperature difference calculated after each diagnosis decreased, the diagnosis was re-diagnosed by releasing the initially diagnosed abnormal state. In contrast, in the second abnormal dangerous state diagnosis step S600 that diagnoses the highest risk state, after diagnosing as the second abnormal dangerous state, the operation of diagnosing whether to release or not is not separately performed 2.7. Abnormality Action Step S700

The abnormality action step takes an action corresponding to the temperature abnormal state diagnosis result progressing step by step as described above.

When diagnosed as the first abnormality warning state in the first abnormality warning state diagnosis step S300 and diagnosed as the second abnormality warning state in the second abnormality warning state diagnosis step S400, the battery pack external relay is blocked and maintained, and when diagnosed as a first abnormal dangerous state in the first abnormal dangerous state diagnosis step S500 and diagnosed as a second abnormal dangerous state in the second abnormal dangerous state diagnosis step S600, measures can be taken to additionally block and maintain the relay inside the battery pack.

Here, it is possible to additionally report the diagnosis result in each abnormal state diagnosis step to an external upper system.

Meanwhile, in the above, only the process of diagnosing the temperature abnormal state of the battery cell has been specifically described, but the present invention is not limited thereto, and even in the case of a battery module/battery pack composed of a plurality of battery cells, it is possible to diagnose the temperature abnormal state of the battery module/battery pack by applying the same method as described above.

On the other hand, although the technical idea of the present invention has been specifically described according to the above embodiment, it should be noted that the above embodiments are for the purpose of explanation and not limitation. In addition, those skilled in the art in the technical field of the present invention will be able to understand that various embodiments are possible within the scope of the spirit of the present invention.

The invention claimed is:

1. A system for diagnosing a temperature abnormal state of a battery cell in a battery pack, the system comprising:
   a first temperature measurer provided at a periphery of the battery cell to measure a cell periphery temperature at a first predetermined periodic interval;
   a second temperature measurer provided on a surface of the battery cell to measure a cell surface temperature at a second predetermined periodic interval;
   a temperature difference calculator configured to calculate a difference between the cell periphery temperature measured by the first temperature measurer and the cell surface temperature measured by the second temperature measurer;
   an abnormal state primary diagnoser configured to compare the temperature difference calculated by the temperature difference calculator to a predetermined temperature abnormal state condition, and first diagnose the temperature abnormal state of the battery cell according to a comparison result, the comparing the temperature difference calculated by the temperature difference calculator to the predetermined temperature abnormal state condition including comparing the temperature difference calculated by the temperature difference calculator with a plurality of reference values, wherein each of the plurality of reference values includes a preset temperature reference value and a preset duration of time reference value that is associated with the preset temperature reference value;

an abnormal state secondary diagnoser configured to finally diagnose a corresponding temperature abnormal state of the battery cell according to whether the corresponding temperature abnormal state continues for a predetermined duration time from a time point at which the abnormal state primary diagnoser diagnoses the temperature abnormal state;

an abnormality action unit configured to take an action corresponding to the final diagnosis result of the abnormal state secondary diagnoser;

a timer configured to measure a time lasting in the corresponding temperature abnormal state from the time point at which the abnormal state primary diagnoser diagnoses the temperature abnormal state; and a memory configured to store reference data for diagnosing the temperature abnormal state of the battery cell in the abnormal state primary and secondary diagnosers.

2. The system of claim 1, wherein the abnormal state primary diagnoser comprises:

a difference comparison unit configured to compare the temperature difference with at least two or more predetermined difference reference values sequentially set from a lowest value, among the plurality of reference values; and an abnormality signal outputter configured to output an abnormality signal according to a comparison result of the difference comparison unit.

3. The system of claim 2, wherein the difference comparison unit compares whether the temperature difference is greater than or less than a predetermined first difference reference value, and from a period thereafter, sequentially compares whether the temperature difference is greater than or equal to a predetermined second difference reference value and third difference reference value as a state in which the temperature difference is greater than or equal to the predetermined first difference reference value is maintained.

4. The system of claim 3, wherein the abnormality signal outputter is configured so that, if the temperature difference is greater than or equal to the predetermined first difference reference value, the abnormality signal outputter outputs a first abnormality signal, if the temperature difference continues to be greater than or equal to the predetermined first difference reference value and becomes greater than or equal to the predetermined second difference reference value, the abnormality signal outputter outputs a second abnormality signal, and if the temperature difference continues to be greater than or equal to the predetermined second difference reference value and becomes greater than or equal to the predetermined third difference reference value, the abnormality signal outputter outputs a third abnormality signal.

5. The system of claim 4, wherein the abnormal state secondary diagnoser is configured so that, if a time that the temperature difference continues in the corresponding temperature abnormal state from a time point at which the first abnormality signal is output from the abnormality signal outputter is more than a predetermined first duration time, finally diagnoses that a temperature state of the battery cell or module is a first abnormality warning state, and outputs a first abnormality warning signal indicating the first abnormality warning state, in a period thereafter, if the temperature difference is longer than the predetermined first duration time from a time point at which the second abnormality signal is output from the abnormality signal outputter, finally diagnoses that the temperature state of the battery cell or module is a second abnormality warning state, and outputs a second abnormality warning signal indicating the second abnormality warning state, in a period thereafter, if the temperature difference is longer than a predetermined second duration time from the time point at which the second abnormality signal is output from the abnormality signal outputter, finally diagnoses that the temperature state of the current battery cell or module is a first abnormal dangerous state, and outputs a first abnormal dangerous signal indicating the first abnormal dangerous state, and in a period thereafter, if the temperature difference is longer than a predetermined third duration time from a time point at which the third abnormality signal is output from the abnormality signal outputter, finally diagnoses that the temperature state of the current battery cell or module is a second abnormal dangerous state, and outputs a second abnormal dangerous signal indicating the second abnormal dangerous state.

6. The system of claim 5, wherein the abnormality action unit, if the first abnormality warning signal or the second abnormality warning signal is output from the abnormal state secondary diagnoser, blocks current flowing into the battery pack from outside, and in the period thereafter, if the first abnormal dangerous signal or the second abnormal dangerous signal is output from the abnormal state secondary diagnoser, additionally disconnects a power line inside the battery pack.

7. The system of claim 1, wherein the plurality of reference values include three reference values.

8. The system of claim 1, wherein the plurality of reference values are stored together with the reference data in the memory.

9. A system for diagnosing a temperature abnormal state of a battery module, the system comprising:

a first temperature measurer provided at a periphery of the battery module configured to measure a module periphery temperature at a first predetermined interval;

a second temperature measurer provided on a surface of the battery module configured to measure a module surface temperature at a second predetermined periodic interval;

a temperature difference calculator configured to calculate a difference between the module periphery temperature measured by the first temperature measurer and the module surface temperature measured by the second temperature measurer;

an abnormal state primary diagnoser configured to compare the temperature difference calculated by the temperature difference calculator to a predetermined temperature abnormal state condition, and first diagnose the temperature abnormal state of the battery module according to a comparison result, the comparing the temperature difference calculated by the temperature difference calculator to the predetermined temperature abnormal state condition including comparing the temperature difference calculated by the temperature difference calculator with a plurality of reference values, wherein each of the plurality of reference values includes a preset temperature reference value and a preset duration of time reference value that is associated with the preset temperature reference value;

an abnormal state secondary diagnoser configured to finally diagnose a corresponding temperature abnormal state of the battery module according to whether the corresponding temperature abnormal state continues for a predetermined duration time from a time point at which the abnormal state primary diagnoser diagnoses the temperature abnormal state;

an abnormality action unit configured to take an action corresponding to the final diagnosis result of the abnormal state secondary diagnoser;

a timer configured to measure a time lasting in the corresponding temperature abnormal state from the time point at which the abnormal state primary diagnoser diagnoses the temperature abnormal state; and a memory configured to store reference data for diagnosing the temperature abnormal state of the battery cell in the abnormal state primary and secondary diagnosers.

10. The system of claim 9, wherein the abnormal state primary diagnoser comprises:

a difference comparison unit configured to compare the temperature difference with at least two or more predetermined difference reference values sequentially set from a lowest value; and an abnormality signal outputter configured to output an abnormality signal according to a comparison result of the difference comparison unit.

11. A method for diagnosing a temperature abnormal state of a battery cell of a battery pack, the method comprising:

a temperature measurement step of measuring a cell periphery temperature and a cell surface temperature of the battery cell at a predetermined periodic interval;

a temperature difference calculation step of calculating a difference between the cell periphery temperature and the cell surface temperature measured in the temperature measurement step;

a first abnormality warning state diagnosis step of comparing whether the calculated temperature difference is maintained for a predetermined first duration time in a state equal to or greater than a predetermined first difference reference value, and diagnosing whether the temperature state of the battery cell is a first abnormality warning state according to a comparison result;

a second abnormality warning state diagnosis step of comparing whether the calculated temperature difference calculated through the temperature difference calculation step is maintained for the predetermined first duration time in a state equal to or greater than a predetermined second difference reference value, which is a value higher than the predetermined first difference reference value, and diagnosing whether the temperature state of the battery module is the second abnormality warning state according to a comparison result, wherein each of the predetermined first and second difference reference values includes a preset temperature reference value and a preset duration of time reference value that is associated with the preset temperature reference value; and an abnormality action step of blocking current inflow from an outside to the battery pack when a current temperature state of the battery cell is diagnosed as the first abnormality warning state by the first abnormality warning state diagnosis step, wherein the first abnormality warning state diagnosis step comprises:

a difference comparison step of comparing whether a current temperature difference calculated in the temperature difference calculation step is equal to or greater than the predetermined first difference reference value; and a duration time confirmation step of confirming whether the temperature difference is maintained for the predetermined first duration time in a corresponding state when the temperature difference is greater than or equal to the predetermined first difference reference value based on the comparison result of the difference comparison step, and wherein, when the temperature difference is maintained for the predetermined first duration time in the state equal to or greater than the predetermined first difference reference value, the current temperature state of the battery cell is diagnosed as the first abnormality warning state.

12. The method of claim 11, further comprising, after diagnosing that the temperature state of the battery module is the first abnormality warning state in the first abnormality warning state diagnosis step, an abnormality action step of maintaining a current inflow cut-off state from the outside to the battery pack at a time of diagnosing the first abnormality warning state when the current temperature state of the battery module is diagnosed as the second abnormality warning state by the second abnormality warning state diagnosis step, wherein the second abnormality warning state diagnosis step comprises:

a difference comparison step of comparing whether the current temperature difference calculated in the temperature difference calculation step is equal to or greater than the predetermined second difference reference value; and a duration time confirmation step of confirming whether the temperature difference is maintained for the predetermined first duration time in a corresponding state when the temperature difference is greater than or equal to the predetermined second difference reference value based on the comparison result of the difference comparison step, wherein, when the temperature difference is maintained for the predetermined first duration time in the state equal to or greater than the predetermined second difference reference value, the current temperature state of the battery module is diagnosed as the second abnormality warning state.

13. The method of claim 12, further comprising, after diagnosing that the temperature state of the battery module is the second abnormality warning state in the second abnormality warning state diagnosis step, a first abnormal dangerous state diagnosis step of diagnosing that the current temperature state of the battery module is a first abnormal dangerous state when the temperature difference in the second abnormality warning state diagnosis step is maintained for a second duration time longer than the predetermined first duration time in the state equal to or greater than the predetermined second difference reference value; and an abnormality action step of additionally cutting off a power line inside the battery pack when the temperature state of the current battery module is diagnosed as the first abnormal dangerous state by the first abnormal dangerous state diagnosis step.

14. The method of claim 13, further comprising, after diagnosing that the temperature state of the current battery module is the first abnormal dangerous state in the first abnormal dangerous state diagnosis step, a second abnormal dangerous state diagnosis step of comparing whether the current temperature difference calculated through the temperature difference calculation step is maintained for a predetermined third duration time in a state equal to or greater than a predetermined third difference reference value, and diagnosing whether the temperature state of the battery module is a second abnormal dangerous state according to a comparison result,
wherein the second abnormal dangerous state diagnosis step comprises:
a difference comparison step of comparing whether the current temperature difference calculated in the temperature difference calculation step is greater than or equal to the predetermined third difference reference value, which is a value higher than the predetermined second difference reference value; and
a duration time confirmation step of confirming whether the temperature difference is maintained for the predetermined third duration time that is longer than the predetermined second duration time in a corresponding state when the temperature difference is greater than or equal to the predetermined third difference reference value according to a comparison result of the difference comparison step,
wherein, when the temperature difference is maintained for the predetermined third duration in the state equal to or greater than the predetermined third difference reference value, it is diagnosed that the current temperature state of the battery module is the second abnormal dangerous state.

15. A method of diagnosing a temperature abnormal state of a battery module of a battery pack, the method comprising:
a temperature measurement step of measuring a module periphery temperature and a module surface temperature of the battery module at a predetermined periodic interval;
a temperature difference calculation step of calculating a difference between the module periphery temperature and the module surface temperature measured in the temperature measurement step;
a first abnormality warning state diagnosis step of comparing whether the calculated temperature difference is maintained for a predetermined first duration time in a state equal to or greater than a predetermined first difference reference value, and diagnosing whether the temperature state of the battery module is a first abnormality warning state according to a comparison result;
a second abnormality warning state diagnosis step of comparing whether the calculated temperature difference calculated through the temperature difference calculation step is maintained for the predetermined first duration time in a state equal to or greater than a predetermined second difference reference value, which includes a value higher than the predetermined first difference reference value, and diagnosing whether the temperature state of the battery module is a second abnormality warning state according to a comparison result,
wherein each of the predetermined first and second difference reference values includes a preset temperature reference value and a preset duration of time reference value that is associated with the preset temperature reference value; and
an abnormality action step of blocking current inflow from an outside to the battery pack when a current temperature state of the battery module is diagnosed as the first abnormality warning state by the first abnormality warning state diagnosis step,
wherein the first abnormality warning state diagnosis step comprises:
a difference comparison step of comparing whether a current temperature difference calculated in the temperature difference calculation step is equal to or greater than the predetermined first difference reference value; and
a duration time confirmation step of confirming whether the temperature difference is maintained for the predetermined first duration time in a corresponding state when the temperature difference is greater than or equal to the predetermined first difference reference value based on the comparison result of the difference comparison step, and
wherein, when the temperature difference is maintained for the predetermined first duration time in the state equal to or greater than the predetermined first difference reference value, the current temperature state of the battery module is diagnosed as the first abnormality warning state.

16. The method of claim 15, further comprising, after diagnosing that the temperature state of the battery module is the first abnormality warning state in the first abnormality warning state diagnosis step,
an abnormality action step of maintaining a current inflow cut-off state from the outside to the battery pack at a time of diagnosing the first abnormality warning state when the current temperature state of the battery module is diagnosed as the second abnormality warning state by the second abnormality warning state diagnosis step,
wherein the second abnormality warning state diagnosis step comprises:
a difference comparison step of comparing whether the current temperature difference calculated in the temperature difference calculation step is equal to or greater than the predetermined second difference reference value; and
a duration time confirmation step of confirming whether the temperature difference is maintained for the predetermined first duration time in a corresponding state when the temperature difference is greater than or equal to the predetermined second difference reference value based on the comparison result of the difference comparison step,
wherein, when the temperature difference is maintained for the predetermined first duration time in the state equal to or greater than the predetermined second difference reference value, the current temperature state of the battery module is diagnosed as the second abnormality warning state.

* * * * *